US011188304B1

(12) United States Patent
Ashour et al.

(10) Patent No.: US 11,188,304 B1
(45) Date of Patent: Nov. 30, 2021

(54) VALIDATING MICROPROCESSOR PERFORMANCE

(71) Applicant: International Business Machines Corporation, Armonk, NY (US)

(72) Inventors: Gal Ashour, Yokneam (IL); Oz Dov Hershkovitz, Zichron Yaacov (IL); Michal Rimon, Nofit (IL); Karen Holtz, Jerusalem (IL); Silvia Melitta Mueller, Altdorf (DE); Avishai Moshe Fedida, Gesher Ha'Ziv (IL)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/917,956

(22) Filed: Jul. 1, 2020

(51) Int. Cl.
| | | |
|---|---|---|
| G06F 7/544 | (2006.01) | |
| G06F 7/483 | (2006.01) | |
| G06F 7/49 | (2006.01) | |
| G06F 7/499 | (2006.01) | |

(52) U.S. Cl.
CPC .............. *G06F 7/544* (2013.01); *G06F 7/483* (2013.01); *G06F 7/4991* (2013.01)

(58) Field of Classification Search
CPC ....... G06F 7/483; G06F 7/4991; G06F 7/5443
See application file for complete search history.

(56) References Cited

U.S. PATENT DOCUMENTS

| | | | | |
|---|---|---|---|---|
| 5,572,664 A | * | 11/1996 | Bujanos ........... | G01R 31/31813 714/25 |
| 2005/0125468 A1 | * | 6/2005 | Enenkel .............. | G06F 11/2226 708/200 |
| 2010/0325186 A1 | * | 12/2010 | Bates ........................ | G06F 7/38 708/524 |
| 2011/0087861 A1 | * | 4/2011 | Bertacco ............... | G06F 11/263 712/202 |
| 2017/0090868 A1 | | 3/2017 | Lutz | |

FOREIGN PATENT DOCUMENTS

| | | |
|---|---|---|
| WO | 2014004220 A1 | 1/2014 |
| WO | 2017068318 A1 | 4/2017 |
| WO | 2018063703 A1 | 4/2018 |

\* cited by examiner

*Primary Examiner* — Chuong D Ngo

(74) *Attorney, Agent, or Firm* — David K. Mattheis; Maeve M. Carpenter

(57) ABSTRACT

Validating microprocessor instruction execution by receiving a floating-point exception selection, receiving a validation method selection, generating validation data according to the floating-point exception selection and the validation method selection by randomly generating a first tensor element value and randomly generating a second tensor element value according to the first tensor element value and the floating-point exception selection, and executing a floating-point computation according to the validation data.

20 Claims, 2 Drawing Sheets

VALIDATING MICROPROCESSOR PERFORMANCE

BACKGROUND

The disclosure relates generally to validating the performance of a microprocessor. The disclosure relates particularly to validating the execution of microprocessor floating-point computation instructions.

Microprocessor designs now include complex operations such as floating-point (FP) cross-product, matrix multiplication, and outer-division instructions. Processor verification during manufacturing includes automated instruction testing sequences where, after system initialization, global system constraints—such as which exceptions are and are not allowed—are defined and the processor executes operations using input data. Input data sets typically include either randomized values, selected within constrained ranges, or values selected according to biases derived from domain knowledge to test the instructions across values of interest.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable microprocessor instruction validation.

Aspects of the invention disclose methods, systems and computer readable media associated with validating microprocessor instructions by receiving a floating-point exception selection, receiving a validation method selection, generating validation data according to the floating-point exception selection and the validation method selection by randomly generating a first tensor element value and randomly generating a second tensor element value according to the first tensor element value and the floating-point exception selection, and executing a floating-point computation according to the validation data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
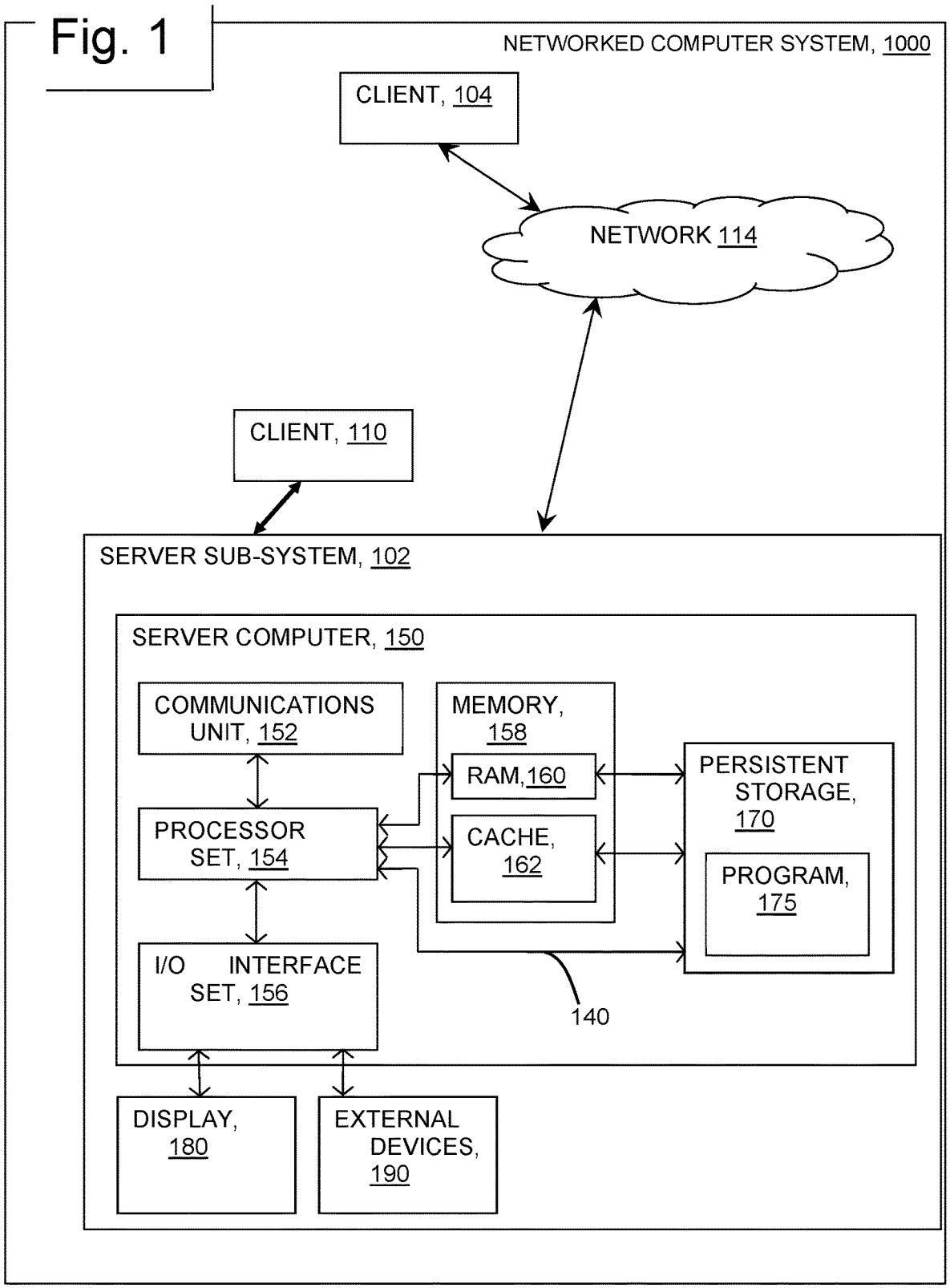
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., generating validation data according to a floating-point exception and validation method, executing a floating-point computation using the validation data, etc.). These solutions are not abstract and cannot be performed as a set of mental acts by a human due to the processing capabilities needed to facilitate microprocessor instruction validation, for example. Further, some of the processes performed may be performed by a specialized computer for carrying out defined tasks related to memory operations. For example, a specialized computer can be employed to carry out tasks related to validating microprocessor instruction performance or the like.

Aspects of the invention disclose methods, systems and computer readable media associated with validating microprocessor instructions by receiving a floating-point exception selection, receiving a validation method selection, generating validation data according to the floating-point exception selection and the validation method selection by determining input value constraints according to the floating-point exception selection, selecting a set of input elements, including a single element of each input tensor, defining values for the set of input values according to the input value constraints, defining neutral values for all remaining input tensor elements, providing the defined input tensors as validation data and executing a floating-point computation according to the validation data.

Aspects of the invention disclose methods, systems and computer readable media associated with validating microprocessor instructions by receiving a floating-point exception selection, receiving a validation method selection, generating validation data according to the floating-point exception selection and the validation method selection by determining input value constraints according to the floating-point exception selection, defining element values for a first input tensor, defining element values for a second input tensor according to the element values of the first input tensor and the input value constraints, providing the defined input tensors as validation data, and executing a floating-point computation according to the validation data.

Efficiently validating complex processor instructions, such as FP outer product instructions, without generating FP exceptions requires input data which will not yield excessively large values—overflow exceptions, excessively small values—underflow exceptions, or values which lose accuracy or least significant bits during processor rounding due to processor precision limits—inexact exceptions. Efficient validation further requires that the input data encompass numerical values of interest for the eventual use of the instructions while avoiding the generation of exceptions. FP outer product instructions generate the outer products of input tensors and add the outer products to an accumulator. Difficulties arise validating such instructions across input values of interest, without generating FP exceptions due to the complexity of the computation instruction and interdependencies of the result upon the input values render The disclosed methods provide validation techniques which enable computationally efficient testing of processor instructions by generating interesting combinations of validation input data which do not trigger FP exceptions. In an embodiment, examples of interesting combinations include results that approach the areas of exception without triggering the exception (e.g., large numbers, but not too large to cause overflow), multiplying a very large number with a very small number, or multiplying two numbers such that the result will be 1.0; for multiply-add, interesting could be that the multiply-add result is 0 (e.g., if the result of the multiplication is non-zero but has the opposite sign to the number of the 'add' operand).

For a microprocessor, a floating point (FP) outer-product instruction calculates the outer product of two input vectors and adds the outer product values to an accumulator. FP calculations for 32-bit values have an upper value limit of about $9.4 \times 10^{38}$, and a lower value limit of about $1.175 \times 10^{-38}$. Calculation yielding results exceeding these values of 32-bit input values, result in overflow and underflow FP exceptions. Inexact FP exceptions are triggered when a FP calculation yields a rounded result which is not exact. In an embodiment, randomly generated validation data sets yield computed results without triggering overflow, underflow, or inexact FP exception while providing input values across input values ranges of interest for the use of the instruction. In this embodiment, a user may select a particular FP exception, underflow, overflow, or inexact, to be avoided, or combinations of exceptions may be specified as exceptions to be avoided. A user may specify the exceptions through a user interface such as a graphical user interface (GUI) to a processor validation program. In an embodiment, the user also specifies the format granularity, e.g., 16-bits, 32-bits, 64-bits, 128-bits, of the FP input data to be generated and used to validate the microprocessor FP outer product instructions.

In an embodiment, a user selects a validation method for the processor instructions. In this embodiment, the user selects either a full matrix validation method, or a sparse matrix validation method. The full matrix validation method utilizes validation input data sets having input vectors and accumulators with full sets of randomly generated values, each randomly generated within a defined range for the particular value. The sparse matrix validation method utilizes validation input data sets having input vectors and accumulators having a single randomly generated value of interest and all other vector and accumulator values set to neutral values to prevent the triggering of a specified FP exception. In an embodiment, the method selects full or sparse matrix validation, for instance where a user fails to make a validation method selection.

In an embodiment, in view of the specified exceptions, the disclosed methods generate validation input data for processing by the outer product instruction without triggering the specified exception, or combination of exceptions. Typical FP data generators solve single FP operations for valid input data, not the more complex set of interdependent FP operations represented by the FP outer product operation. (Each element of a first input vector (tensor) is multiplied by each element of a second input vector (tensor) with each product added to a particular cell of the associated accumulator. In an embodiment, a user specifies FP exceptions to be avoided and all products and accumulated values must avoid the specified overflow, underflow and inexact conditions.)

In an embodiment using a full matrix validation method, values for a first input vector are generated using a random number function operating across a value range of interest and avoiding underflow, overflow and inexact exception triggering values. The selection of values for the first vector, may be non-uniform by giving higher weight to big values, small-values, values around 1 and zeros, or other subset of interest. In this embodiment, after generating the first input vector values, second input vector values are derived using the generated first input vector values and the specified global constraints—the specified FP exceptions to be avoided. In this embodiment, values for the second input vector include randomly generated values satisfying the specified exception constraints. The method uses the specified constraints and first vector values to define ranges from which random values are selected for the second vector elements. In this embodiment, after the first and second input vectors are defined, the outer product values are generated, and a typical FP generator generates random values for the initial input value for the respective accumulator cells associated with each value of the calculated outer products of the two input vectors. For multiply instructions, the outer product values are written to accumulator cells, overwriting any existing values. In this embodiment, the method does not generate a random value for the accumulator cells.

In this embodiment, execution of the FP outer product instruction using the generated random accumulator values together with the first input vector and second input vector values, satisfies the specified global exception constraints. In this embodiment, the validation input data includes random values for the first input vectors, the second input vectors, and the accumulators.

In an embodiment utilizing a sparse matrix validation method, single elements of each of the first and second input vectors are selected, together with the element of the accumulator associated with the outer product of the selected input vector values. In this embodiment, the method utilizes a conventional FP generator and generates a random FP value for the selected element of the first input vector, a random value for the selected element of the second input vector and a random value for the associated accumulator element, in view of the specified global FP exception constraints. In this embodiment, all remaining elements of the input vectors and accumulator cells are populated with neutral values which will not interact to trigger a specified FP exception. As an example, all other elements of the input data are set to quiet not-a-number (qNaN) values which propagate through the FP outer product instruction processing without triggering an FP exception. In this embodiment, the method generates validation input data including random values for single elements of the first and second input vectors together with a random value for the associated accumulator value. The method generates the set of random values with consideration for the specified FP exceptions such that execution of the FP outer product instructions using the generated values does not trigger the specified FP exceptions. In an embodiment, the method uses a typical FP generator to generate the selected element values. The generated qNaN values for the remainder of the validation input also do not trigger the specified FP exceptions. In this embodiment, the method accepts input from a user relating to the number of validation input data sets to process using the FP outer product instructions.

As an example of sparse matrix validation input data generation, input data includes two vectors, Xa, having elements a1, a2, a3, and a4, Xb, having elements b1, b2, b3, and b4. Accumulator Xc has elements C1-C16 for the outer product results of Xa⊕Xb. For example, elements a2, and b3, are selected together with accumulator value c7, for the product of the selected elements. For the example, overflow exceptions are to be avoided. The method generates random FP values for a2, b3, and C7. All remaining elements of Xa, Xb, and Xc, are populated with qNaN values and the now complete Xa, Xb, and Xc are passed to the microprocessor for use in executing the FP outer product instructions for validation. The method repeats these steps for as many cycles as specified by the user in initializing the validation testing of the microprocessor instructions.

As an example of the full matrix validation method, the method generates random FP values for the elements of Xa (possibly with some bias to specific ranges of possible numbers). The method then computes the worst-case criteria from the most restrictive element in Xa, according to the specified global FP exception constraints. The method derives a constraint on the elements of Xb (and in the case of multiply-add also on the values of xc). For a specification to avoid overflow, the method generates the 4 elements of Xa (a1, a2, a3, and a4) in such a way that none of these numbers have exponent larger than the max 'normal' exponent (i.e., avoid NaN and Infinite ranges). Then, out of the numbers generated for Xa, the method selects the one with the highest exponent, and determines the difference between that exponent and the maximal exponent supported by that format. The method then generates values for Xb. The method requires that the numbers generated for Xb have an exponent part that is smaller than the value identified in the previous step. Once Xa and Xb are determined, then in the case of a multiply add instruction, the method either lets a traditional FP solver identify 'acceptable' numbers for the Xc elements or identifies constraints for these numbers. Unlike the elements of Xa and Xb, the elements of the Xc do not impose inter-dependency constraints and each element of Xc affects only a single computation in the result matrix. For underflow, a similar approach can be taken to the one used for overflow, but for this example, the method would select the smallest exponent in the elements of Xa, identify the difference between that element's exponent and the minimum exponent supported by the format/granularity, and then derive a constraint on the exponents of Xb elements to yield values larger than that underflow threshold. In case of a multiply-add the method identifies constraints on Xc elements to avoid underflow.

As another example for computing worst case constraints for a full matrix approach, a first input vector Xa, includes four elements, and a second input vector Xb, also includes four elements. For this example, sixteen constraints are defined, one constraint for each possible element of the Xa, Xb outer product. For overflow exceptions, each constraint relates to the maximum possible value of the Xa exponent portion+Xb exponent portion which is less than the maximum allowable FP exponent portion and therefore avoids triggering an overflow exception. The sixteen defined constraints are passed to a constraints engine to determine a valid solution for the values of Xa and Xb which will not trigger the overflow exception. Similarly, additional sets of sixteen constraints are generated and passed to the constraints engine for each FP exception to be avoided.

For avoiding inexact exceptions, the method uses different logic. The method generates random values for one set of numbers e.g., Xa elements, or utilizes testing knowledge to bias the selection ranges to specific ranges of numbers of interest. The method then identifies the generated element with the least number of trailing zeros in the fraction part and requires that Xb elements have a fraction part that has enough trailing zeros in its least-significant-bits. In an embodiment, the method increases this threshold by a safety margin to account for carry over in the computation. For example, a 32 bits FP has 23 bits of fraction. If after generating Xa elements, the value with the least trailing zeros was a2 with only 3 trailing zeros, then the method will allow randomly generated Xb elements to have only the first 3 most-significant-bits of its fraction part to be non-zero, and at least 20 trailing zeros. If on the other hand the worst case of Xa was a4 and as it happened also the least significant bit of its fraction was '1' (i.e., zero trailing zeros), then the method requires randomly generated Xb elements to have only zeros in their fraction part. For a multiply-add, the method feeds a specific element from Xa and a specific element from Xb to a traditional solver to define the specific Xc element associated with them (since the Xc elements do not have residual effect on the other cells, a traditional solver can be used). In an embodiment having a specification to avoid a combination of FP exceptions, (e.g., both inexact, overflow and underflow, or any other subset), the method creates a super-set of all the constraints defined above from the respective exceptions.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects via a wired connection or wirelessly to server sub-system 102. Client device 104 connects wirelessly to server sub-system 102 via network 114. Client devices 104 and 110 comprise validation testing program (not shown) together with sufficient computing resource (processor, memory, network communications hardware) to execute the program. Client devices 104 and 110 may include GUI for enabling a user to interact with validation testing resources resident upon the server subsystem. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, including one or more processors subject to instruction validation by microprocessor instruction validation program 175 memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the microprocessor instruction validation program 175, are stored in persistent storage 170 for execution and/or access by one or more of the respective processor(s) 154 including potential test processors of server computer 150 via cache 162. In this embodiment, persistent storage 170 includes a magnetic hard disk drive. Alternatively, or in addition to a magnetic hard disk drive, persistent storage 170 can include a solidstate hard drive, a semiconductor storage device, a read-only memory (ROM), an erasable programmable read-only memory (EPROM), a flash memory, or any other computer readable storage media that is capable of storing program instructions or digital information.

In an embodiment, a test generation module of microprocessor instruction validation program generates appropriate tests for the subject microprocessor instructions. In this embodiment, the test generation module may be run in a first computing environment, with the actual instruction validation of either a software simulation of the subject microprocessor design, or actual microprocessor hardware, run in a second computing environment.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, processor testing fixtures including one or more microprocessors being validated, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., microprocessor instruction validation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
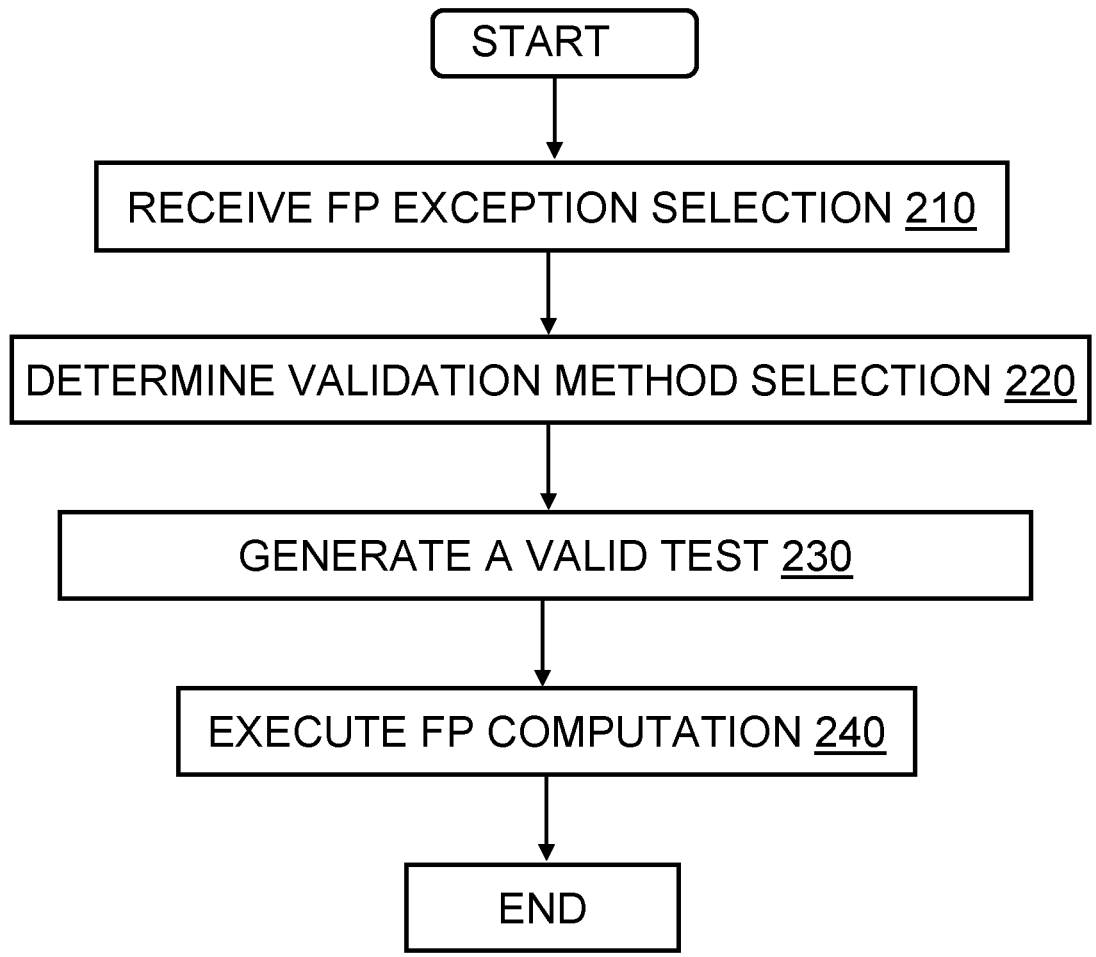
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of microprocessor validation program 175 receives a user selection of floating-point exceptions to be avoided during the instruction validation testing. The received selection may include overflow underflow and inexact exception as well as combinations of these exceptions.

At block 220, the method of microprocessor validation program 175 determines a validation method for use during the validation testing. In an embodiment, the method receives a validation method selection from a user. In an embodiment, the method selects a validation method in the absence of a selection from a user. Validation methods include full matrix validation and sparse matrix validation.

The method utilizes the FP exception selection and validation method determination in generating validation input data for the instruction testing.

At block 230, of microprocessor validation program 175 generates validation test input values for microprocessor instruction testing, including testing of FP outer product instructions. The method generates random FP values for each of a first and second input tensors and for some instructions, random FP values for an accumulator tensor as well. The random FP values for the second input tensor and accumulator tensor are determined with consideration of the selected FP exceptions to be avoided as well as the validation method to be used.

This phase is done off-line, and generates the desired (one or more) test scenario(s), each containing one or more instructions, including FP outer-product instructions, and their content (i.e., which registers each instruction uses, and what content (values) should the input registers contain to satisfy the required biases and constraints—such as, but not limited to, which exceptions are allowed or should be avoided). These biases or constraints could be either directed by the verification engineer (constructing the test scenario), or left undetermined—in which case the system will select (either by random or any other heuristics).

For a sparse matrix validation, the method of microprocessor validation program 175 selects a single element from each of the first and second input tensors, together with the associated element of the accumulator. the method utilizes a conventional FP generation solver to produce interesting values. and populates all remaining first tensor and second tensor elements, for an outer product instruction, or first tensor, second tensor and accumulator elements for an outer product multiply/multiply add instruction, with neutral values which will not trigger the specified FP exceptions.

For full matrix validation methods, the method of microprocessor validation program 175 generates random FP values for each element of the first input tensor. The method then generates random values for each element of the second input tensor with consideration of the values of the first tensor elements as well as the specified FP exceptions to be avoided. For add instructions, the method then generates random values for the accumulator elements in consideration of the values of the first and second tensors as well as the specified FP exceptions.

At block 240, microprocessor validation program 175 executes the microprocessor instruction being tested using the generated FP validation input data set. In an embodiment, the method repeats the testing sequence of each specified microprocessor instruction, including FP outer-product instructions for a number of iterations specified by a user. In an embodiment, a default number of tests are generated and executed for each specified instruction. The results of the validation testing are provided to the user and the validation testing program ends.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for validating microprocessor instruction execution, the method comprising:
   receiving a floating-point exception selection;
   receiving a validation method selection;
   generating validation data according to the floating-point exception selection and the validation method selection by randomly generating a first tensor element value and randomly generating a second tensor element value according to the first tensor element value and the floating-point exception selection; and
   executing a floating-point computation according to the validation data.

2. The computer implemented method according to claim 1, wherein the floating-point exception selection comprises an underflow exception.

3. The computer implemented method according to claim 1, wherein the floating-point exception selection comprises an overflow exception.

4. The computer implemented method according to claim 1, wherein the floating-point exception selection comprises an inexact exception.

5. The computer implemented method according to claim 1, wherein generating validation data according to the floating-point exception selection and the validation method selection comprises:
   determining input value constraints according to the floating-point exception selection;
   selecting a set of input tensor elements, the set of input tensor elements comprising a single element of each input tensor;
   defining values for the set of input tensor elements according to the input value constraints;
   defining neutral values for remaining input tensor elements; and
   providing the defined values for the set of input tensor elements and the remaining input tensor elements as validation data.

6. The computer implemented method according to claim 1, wherein generating validation data according to the floating-point exception selection and the validation method selection comprises:
   determining input value constraints according to the floating-point exception selection;
   defining element values for a first input tensor;
   defining element values for a second input tensor according to the element values of the first input tensor and the input value constraints; and
   providing the first input tensor and second input tensor as validation data.

7. The computer implemented method according to claim 1, further comprising randomly generating an accumulator value associated with the first tensor element value and the second tensor element value.

8. A computer program product for validating microprocessor instruction execution, the computer program product comprising one or more computer readable storage devices and program instructions collectively stored on the one or more computer readable storage devices, the stored program instructions comprising:
   program instructions to receive a floating-point exception selection;
   program instructions to receive a validation method selection;
   program instructions to generate validation data according to the floating-point exception selection and the validation method selection by randomly generating a first tensor element value and randomly generating a second tensor element value according to the first tensor element value and the floating-point exception selection; and
   program instructions to execute a floating-point computation according to the validation data.

9. The computer program product according to claim 8, wherein the floating-point exception selection comprises an underflow exception.

10. The computer program product according to claim 8, wherein the floating-point exception selection comprises an overflow exception.

11. The computer program product according to claim 8, wherein the floating-point exception selection comprises an inexact exception.

12. The computer program product according to claim 8, wherein the stored program instructions to generate validation data according to the floating-point exception selection and the validation method selection comprise:
   program instructions to determine input value constraints according to the floating-point exception selection;
   program instructions to select a set of input tensor elements, the set of input tensor elements comprising a single element of each input tensor;
   program instructions to define values for the set of input tensor elements according to the input value constraints;
   program instructions to define neutral values for remaining input tensor elements; and
   program instructions to provide the defined values for the set of input tensor elements and the remaining input tensor elements as validation data.

13. The computer program product according to claim 8, wherein the stored program instructions to generate validation data according to the floating-point exception selection and the validation method selection comprise:
   program instructions to determine input value constraints according to the floating-point exception selection;
   program instructions to define element values for a first input tensor;
   program instructions to define element values for a second input tensor according to the element values of the first input tensor and the input value constraints; and
   program instructions to provide the first input tenor and second input tensor as validation data.

14. The computer program product according to claim 8, the stored program instructions further comprising program instructions to randomly generate an accumulator value associated with the first tensor element value and the second tensor element value.

15. A computer system for validating microprocessor instruction execution, the computer system comprising:
one or more computer processors;
one or more computer readable storage devices; and
stored program instructions on the one or more computer readable storage devices for execution by the one or more computer processors, the stored program instructions comprising:
program instructions to receive a floating-point exception selection;
program instructions to receive a validation method selection;
program instructions to generate validation data according to the floating-point exception selection and the validation method selection by randomly generating a first tensor element value and randomly generating a second tensor element value according to the first tensor element value and the floating-point exception selection; and
program instructions to execute a floating-point computation according to the validation data.

16. The computer system according to claim 15, wherein the floating-point exception selection comprises an underflow exception.

17. The computer system according to claim 15, wherein the floating-point exception selection comprises an overflow exception.

18. The computer system according to claim 15, wherein the floating-point exception selection comprises an inexact exception.

19. The computer system according to claim 15, wherein the stored program instructions to generate validation data according to the floating-point exception selection and the validation method selection comprise:
program instructions to determine input value constraints according to the floating-point exception selection;
program instructions to select a set of input tensor elements, the set of input tensor elements comprising a single element of each input tensor;
program instructions to define values for the set of input tensor elements according to the input value constraints;
program instructions to define neutral values for remaining input tensor elements; and
program instructions to provide the defined values for the set of input tensor elements and the remaining input tensor elements as validation data.

20. The computer system according to claim 15, wherein the stored program instructions to generate validation data according to the floating-point exception selection and the validation method selection comprise:
program instructions to determine input value constraints according to the floating-point exception selection;
program instructions to define element values for a first input tensor;
program instructions to define element values for a second input tensor according to the element values of the first input tensor and the input value constraints; and
program instructions to provide the first input tenor and second input tensor as validation data.

\* \* \* \* \*